United States Patent [19]

Ritscher et al.

[11] 4,297,328

[45] Oct. 27, 1981

[54] THREE-WAY CATALYTIC PROCESS FOR GASEOUS STREAMS

[75] Inventors: James S. Ritscher, Ossining; Michael R. Sandner, Chappaqua, both of N.Y.

[73] Assignee: Union Carbide Corporation, New York, N.Y.

[21] Appl. No.: 80,132

[22] Filed: Sep. 28, 1979

[51] Int. Cl.$^3$ .............................................. B01D 53/36
[52] U.S. Cl. .................................. 423/213.2; 60/301; 423/239; 423/245; 423/247
[58] Field of Search .................. 423/213.2, 213.5, 245, 423/247; 60/301; 252/455 Z

[56] References Cited

U.S. PATENT DOCUMENTS 3,346,328 10/1967 Sergeys ............................. 423/213.2
3,716,344 2/1973 Ashburn ........................... 423/213.2
4,157,375 6/1979 Brown et al. ....................... 423/239
4,170,571 10/1979 Ritscher ........................... 252/455 Z

FOREIGN PATENT DOCUMENTS 2263387 7/1973 Fed. Rep. of Germany ... 423/213.2
2411853 9/1974 Fed. Rep. of Germany ... 423/213.2

Primary Examiner—G. O. Peters
Attorney, Agent, or Firm—Gary L. Wamer

[57] ABSTRACT

A process for the catalytic combustion of carbon monoxide and hydrocarbons and the catalytic reduction of the oxides of nitrogen contained in a gas stream. The process involves intimately contacting the gaseous stream with a catalyst bed comprising copper metal or copper ion and a high silica zeolite.

12 Claims, 1 Drawing Figure

THREE-WAY CATALYTIC PROCESS FOR GASEOUS STREAMS

FIELD OF THE INVENTION

This invention relates to a process for the catalytic oxidation of carbon monoxide and hydrocarbons and the reduction of nitrogen oxides contained in a gaseous stream. The process may occur in a stoichiometric excess of oxygen without substantial decrease in the conversion to non-noxious products.

BACKGROUND OF THE INVENTION

One of the most troubling pollution control problems today arises from the emissions of automobiles. The noxious emissions are of essentially three types. These are: (1) carbon monoxide (CO), (2) hydrocarbons (HC) and (3) nitrogen oxides ($NO_x$).

The simultaneous control of these various pollutants presents a formidable technical problem because of varying nature of the pollutants. Control of carbon monoxide and hydrocarbons is a relatively simple matter to achieve catalytically. The simultaneous control of nitrogen oxides, carbon monoxide and hydrocarbons, by a so-called "three-way" catalyst, is a much more difficult problem.

The need to simultaneously control these three types of pollutants has long been recognized. It has long been known that nitrogen oxides are both pollutants and initiators for complex photochemical reactions with hydrocarbons. The resultant "photochemical smog" is a serious problem. Carbon monoxide is a serious pollutant in and of itself.

Carbon monoxide is a relatively easy pollutant to control and is easily combusted in a catalytic unit to carbon dioxide. Even under an oxygen-deficient atmosphere, carbon monoxide will be combusted to the oxygen limiting value by any noble metal, and many base metal, catalyst.

The catalytic control of various "hydrocarbons" is more difficult. The combustion of hydrocarbons to carbon dioxide and water varies in complexity depending on the nature of the hydrocarbon. The group referred to as "hydrocarbons" includes many different substrates, some being very reactive while others are highly refractory. This group also includes small amounts of hydrogen which is easily oxidized. A small amount of methane is included in this group, and is a hydrocarbon which is relatively difficult to oxidize. Most "hydrocarbon" pollutants are considerably easier to oxidize than methane, but since they only weakly chemisorb on catalytic surfaces, they are more difficult to oxidize than carbon monoxide and hydrogen.

In general the nitrogen oxides troublesome from a pollution standpoint are nitric oxide (NO) and nitrogen dioxide ($NO_2$) and are both referred to herein by the formula $NO_x$. The elimination of $NO_x$ is generally achieved by the reduction of $NO_x$ to elemental nitrogen. In theory, NO can be disproportionated to yield $N_2$ and $O_2$, since it is thermodynamically unstable with respect to its elements. Even so, there is no known catalyst for this disproportionation and absent such a catalyst it does not occur at an appreciable rate.

The present means for oxidizing "hydrocarbons" and carbon monoxide is by use of noble metal catalysts in the presence of sufficient oxygen for complete combustion. In practice, this requires a slight excess of oxygen such that an amount in excess of the stoichiometric amount is provided. In addition, base metal catalysts may be used for the combustion of hydrocarbons if the operating temperature of the catalyst is raised sufficiently.

Although no catalyst is presently known for catalyzing the disproportionation of $NO_x$, a variety of catalysts are known which reduce $NO_x$ to $N_2$, using carbon monoxide, hydrogen or hydrocarbons as the reductant. Since all three of these reductants are present in normal automobile emissions, this would appear to be a simple matter. Unfortunately, oxygen is also present in such emissions and most catalysts which reduce $NO_x$ will not operate effectively in an oxidizing atmosphere. Instead of reducing $NO_x$ the reductants reduce oxygen. In addition, some of the noble metals used to oxidize carbon monoxide and hydrocarbons, i.e., platinum and palladium, tend to reduce $NO_x$ to ammonia in a highly efficient manner. Since ammonia is highly noxious, its production is undesirable. Thus, platinum and palladium either alone or in combination, are not suitable for controlling the pollutant $NO_x$. To avoid the production of ammonia the catalyst may be chosen as either rhodium or ruthenium, either alone or in combination, as both efficiently catalyze the reduction of $NO_x$ to $N_2$. Unfortunately, the use of these catalysts create a number of problems.

Ruthenium tends to form volatile oxides in an even slightly oxidizing atmosphere and these oxides are then distilled out of the catalytic system. In addition to the resulting loss in catalytic activity, ruthenium and its compounds are highly toxic. Therefore, from a practical standpoint, only rhodium can be used for the reduction of $NO_x$ to nitrogen. Rhodium, however, does not function as a suitable catalyst when used in an even slightly oxidizing atmosphere. Thus, there must always be excess reductant present if rhodium is to be used. Unfortunately, if too much reductant is present the reduction of $NO_x$ to ammonia on platinum or palladium occurs. As a result of these countervailing considerations, the conversion of $NO_x$ to nitrogen can be accomplished by rhodium only over a narrow range of oxidant and reductant, i.e., the oxidant/reductant ratio.

The above-noted oxidant/reductant ratio must be carefully controlled for the three presently known "three way" catalyst systems, i.e. platinum/rhodium; platinum/ruthenium; and monel. The narrow range of oxidant/reductant, i.e., air/fuel, under which the catalysts are operable is referred to as the "window" for the catalyst and the overall effect is referred to as the "window effect". The stoichiometric ratio of air to fuel, referred to as the air/fuel ratio or A/F ratio, is dependent on the nature of the fuel. For the fuels commonly employed for automobiles it is preferably about 14.7. When the A/F ratio is less than 14.7, the mixture is referred to as "rich", i.e., excess fuel is present in the mixture. When the A/F ratio is above 14.7 the mixture referred to as "lean", i.e., excess air or oxygen is present in the mixture. An A/F unit is simply a change in the A/F ratio of 1.0.

The three presently known "three-way" catalysts referred to above operate properly when the fuel mixture is "rich" i.e. when the A/F ratio is less than 14.7 and the environment is a reducing atmosphere. However, if the A/F ratio is much less than about 14.7 unacceptable levels of carbon monoxide and hydrocarbons pass through the catalyst unoxidized. The limits, i.e. the range of A/F values, under which the catalysts effectively control all three pollutants, i.e., the "window", is between 14.4 and 14.7. When the A/F ratio moves outside these values the catalyst performance and therefore, the control of pollutants dramatically decreases. Further, below an A/F ratio of about 14.4, the formation of ammonia on the platinum catalyst becomes a significant problem.

Further, although "monel" is referred to as a "three-way" catalyst this characterization of monel is a poor one. While the platinum/rhodium and platinum/ruthenium catalysts exhibit significant oxidizing activity "monel" exhibits relatively poor oxidizing activity. "Monel" is also structurally unstable in a cycling environment, i.e., if the A/F ratio changes from rich to lean and back, as is often the case, and under this environment the catalyst deteriorates rapidly. "Monel" is also easily poisoned by sulfur which is present in small amounts in motor fuels.

Further, the efficient use of the known "three-way" catalysts requires the constant maintenance of an air to fuel ratio within 0.3 A/F units of a certain air/fuel ratio value, as determined by the particular fuel. Unfortunately, even modern carburetors cannot control the A/F ratio to within 0.3 A/F units. Therefore, the exhaust stream is constantly shifting outside the acceptable A/F ratio for efficient use of the catalyst. Further, the mixture must still be operated on a "rich" mixture which gives inherently poor fuel economy.

To circumvent the problems associated with the presently known "three-way" catalysts various engineering techniques may be employed. The use of an oxygen sensor connected in a feedback loop to a microprocessor, whereby the carburetor is controlled, is perhaps one of the better suggested methods. Unfortunately, this technique greatly increases the complexity and cost of the carburetion system and the carburetor must still operate on the "rich" side of the air/fuel mixture which inherently lessens fuel economy. Alternatively, a two-stage system may be employed wherein a first reducing stage is followed by the introduction of excess air and a second oxidizing stage. Unfortunately, this technique also increases the complexity and cost of the carburetion system and must also be operated on the "rich" side of the air/fuel mixture.

A further catalyst system is known to the prior art which although not generally thought of as a "three-way" catalyst does exhibit some "three-way" activity. This catalyst comprises an iridium-based catalyst and employes a two-stage catalyst system. The catalyst system has poor oxidizing activity, but has the advantage of operating efficiently in an oxidizing atmosphere, i.e., on a "lean" air/fuel mixture. Furthermore, the "window" for which the catalyst operates efficiently, i.e. as a three-way catalyst, is narrow, although larger than the three previously discussed, and beyond another 0.3 A/F units the $NO_x$ reduction is relatively poor.

The above-noted catalysts all have a further inherent disadvantage. Each catalyst employs a noble metal system or iridium. These metals are extremely scarce and expensive. In particular, the scarcity and expense of rhodium, the preferred reduction catalyst, raises serious questions over its continued use as a catalyst for automobile emissions. In fact, the price of rhodium has more than doubled since 1975 and is presently about $800.00 per troy ounce.

A preferred "three-way" catalyst would minimize the problems of presently known catalysts. Such a preferred catalyst should operate over an A/F range of up to about 2.0 A/F units. Further, such a catalyst should operate efficiently in an oxidizing atmosphere, i.e., on the "lean" side of the air/fuel mixture wherein the A/F ratio is greater than about 14.7.

Further, it has been suggested that the oxides of nitrogen may be reduced by use of a zeolite exchanged against a catalytically active metal when said reduction is performed in the presence of an efficient amount of carbon monoxide and/or hydrogen. Such a process is disclosed in Disclosure Publication 2,411,853 of the German Federal Republic—corresponding U.S. Application, Ser. No. 340,809—wherein oxides of nitrogen are reduced in an exhaust gas comprising not more than 2% oxygen. The German disclosure has as a requirement that no more than 2% oxygen ever be present in the exhaust gas undergoing treatment. In addition, the disclosed process does not utilize the novel features of high-silica zeolites but instead utilizes zeolites such as mordenite, zeolite Y or natural zeolites such as faujasite, chabazite and erionite. Further, the disclosed process must use a nickel exchanged zeolite to minimize the production of ammonia. Further, the disclosed process requires that the amount of oxidizing gases must not be so large as to consume all reducing gas before the reduction of the oxides and nitrogen. Thus, the process requires that less than stoichiometric amounts of oxidizing gases, e.g., oxygen, be present and, as specifically claimed, the concentration of oxygen must be 2% or less.

In addition, the use of high-silica zeolites for the adosrption/combustion of an organic substrate is disclosed in co-pending U.S. application Ser. No. 053,149 filed June 29, 1979.

This co-pending application discloses another important characteristic of these high-silica zeolites, that is their ability to adsorb an organic substrate, i.e. organic compounds, until the organic substrate is catalytically acted upon. In the particular case of an gaseous exhaust stream, this characteristic provides a means of capturing and storing the organic substrate from the gaseous stream while the temperature of the stream is raised to the optimum temperature required for the catalytic process.

Further, the use of a metal containing high-silica zeolite catalyst is disclosed in co-pending U.S. Ser. No. 865,125, filed Dec. 28, 1977. U.S. Ser. No. 865,125 discloses a process for producing carbon dioxide by the conversion of hydrocarbons and carbon monoxide in a gas stream in admixture with oxygen and water vapor wherein said gas stream is contacted with a metal containing crystalline zeolite aluminosilicate. The metal is chosen from Group VIII metals. The catalyst of this co-pending application may also promote the conversion of nitric oxide to nitrogen when the gas stream is sufficiently low in oxygen such that the gas stream is essentially neutral or is reducing in the redox sense.

The present invention provides a "three-way" catalyst having advantages beyond those disclosed in the prior art.

The present invention provides a "three-way" catalyst that is relatively inexpensive in that it employs the use of a base metal, rather than a noble metal.

Further, the present invention provides a "three-way" catalyst which effectively controls emissions of carbon monoxide and hydrocarbons and provides a "three-way" catalyst wherein oxides of nitrogen are reduced preferentially to $N_2$ over a A/F ratio range of up to about 2.0 units.

Further, the present invention provides a "three-way" catalyst which effectively converts oxides of nitrogen to nitrogen without the production of significant amounts of ammonia, even in the absence of oxygen and with an stoichiometric excess of hydrocarbon.

Further, the present invention provides a "three-way" catalyst that is thermally stable under the conditions of oxidation and reduction and is stable in an environment that cycles from "rich" to "lean" air/fuel mixtures.

Finally, the present invention provides a "three-way" catalyst that is easily prepared, stable to handle and is virtually nontoxic.

The instant invention provies a "three-way" catalyst having the above characteristics and overcomes the difficulties of the prior art by utilizing the unusual and unexpected behavior of catalysts which employ the use of high-silica zeolites. It has been found that copper-containing high-silica zeolites provide a catalytic system for the simultaneous oxidation of carbon monoxide and hydrocarbons to essentially carbon dioxide and water and for the reduction of oxides of nitrogen to nitrogen.

The instant invention is more fully discussed hereinafter in the detailed description of the invention.

DETAILED DESCRIPTION OF THE INVENTION

Figure 1:
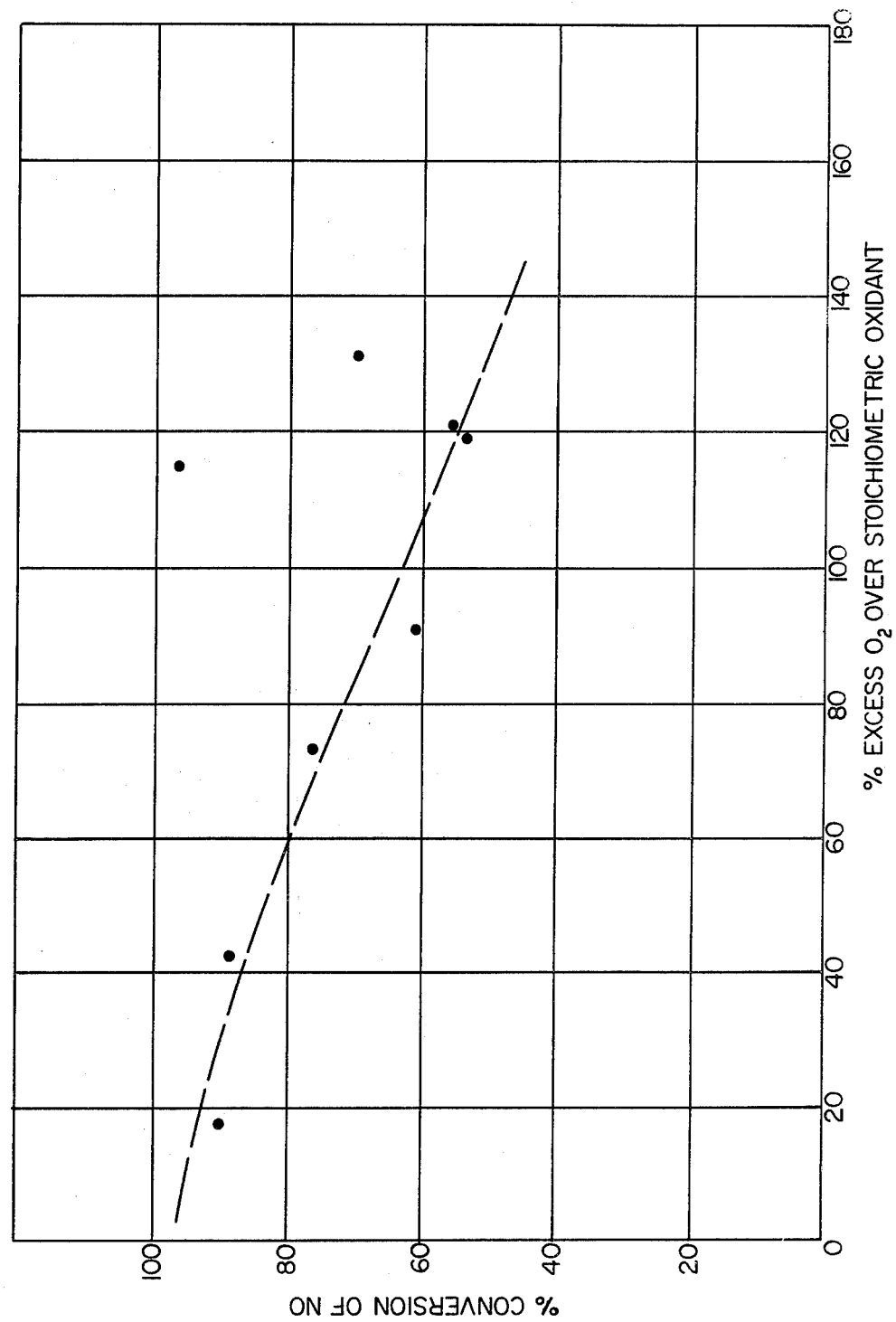

The process of the present invention overcomes the problems associated with those "three-way catalysts" known to the prior art by utilizing the unique behavior of copper-containing high-silica zeolites.

The novel "three-way" catalyst and process of the invention utilize the unusual properties of high-silica zeolites, i.e. those having a $SiO_2/Al_2O_3$ molar ratio which exceeds about 10 and preferably about 20. It has been found that these high-silica zeolites are organophilic and hydrophobic, and may be utilized to oxidize carbon monoxide and hydrocarbons and reduce oxides of nitrogen when they contain copper metal or copper metal ions.

It has been found that these high-silica zeolites, unlike the aluminas, maintain a relatively high adsorption capacity even at a temperature of 200° C. This behavior is to be distinguished from that of conventional zeolites, e.g. Zeolite A, U.S. Pat. No. 2,882,243; Zeolite X, U.S. Pat. No. 2,882,244; and Zeolite Y, U.S. Pat. No. 3,216,789; which tend to strongly adsorb water and only weakly adsorb an organic substrate. In addition, the thermal and hydrothermal stabilities of these high-silica zeolites are often hundreds of degrees Centigrade higher than those of conventional zeolites, i.e. in excess of 800° C.

The above-mentioned high-silica zeolites may be used so as to form "three-way" catalysts which circumvent most of the problems associated with the previously discussed catalysts. The "three-way" catalyst used herein is prepared by introducing the metal into the framework of the high-silica zeolite to form a copper-containing high silica zeolite which exhibits both unique adsorption and catalytic characteristics when used in combination with a catalytic metal. Because these high-silica zeolites have the capacity to undergo ion-exchange, the catalytic metal or metal ion may be conveniently introduced directly into the zeolite framework.

The copper-containing high-silica zeolites, i.e. three-way catalysts, of the present invention are prepared by introducing copper metal or copper ions into the high-silica zeolite framework. As will be evident from the nature of the process and from the following examples, any zeolite or zeolite-like material having a $SiO_2/Al_2O_3$ molar ratio which exceeds about 10 and having the characteristics of these high-silica zeolites will function as the zeolite used herein. However, in order to achieve the most desirable results, the particular zeolite used herein should preferably have certain additional characteristics, as follows:

Firstly, the zeolite should be metal ion-exchanged, -doped, or loaded sufficiently so as to provide an efficient amount of catalytic metal within or on the zeolite.

Secondly, the zeolite should be thermally stable and in addition, be thermally stable in the presence of steam; that is, it should have thermal and hydrothermal stability at the temperatures at which the catalytic process occurs. Typically a thermal and hydrothermal stability of at least about 600° C. is suitable for the present invention although this value depends on the nature of the gaseous stream being combusted and the chosen process parameters, e.g. flow rate, reaction time, water content and operating temperatures.

In general, any zeolite, a crystalline material having an intracrystalline void volume, having a silica to alumina ratio greater than 10, preferably greater than 20, will be found to perform satisfactorily as the zeolite for forming the metal-containing high-silica zeolite.

Representative of those high-silica zeolites having the above-identified properties, but not limited thereto, are "silicalite", ZSM-5, ZSM-8, ZSM-11, ZSM-12, Hyper Y, ultrastabilized Y, hereinafter designated "ultra-Y", Beta, mordenite and erionite. It is to be understood that other zeolites having the properties described herein may be used without departing from the scope of the present invention. "Silicalite" is a novel crystalline silica composition having a hydrophobic/organophilic characteristic which permits its use for selectively adsorbing organic materials preferentially to water. Silicalite is more completely described in U.S. Pat. No. 4,061,724, assigned to Union Carbide Corporation. It is described in claim 1 of said patent as, "A silica polymorph consisting of crystalline silica, said silica polymorph after calcination in air at 600° C. for 1 hour, having a mean refractive index of 1.39±0.01 and a specific gravity at 25° C. of 1.70±0.05 g./cc." and in claim 2 as, "A silica polymorph consisting of crystalline silica, said silica polymorph after calcination in air at 600° C. for 1 hour having as the six strongest d-values of its X-ray powder diffraction pattern those set forth in Table A."

Table A is as follows:

TABLE A

| d-A | Relative Intensity[a] |
|---|---|
| 11.1 ± 0.20 | VS |
| 10.0 ± 0.20 | VS |
| 3.85 ± 0.07 | VS |
| 3.82 ± 0.07 | S |
| 3.76 ± 0.05 | S |
| 3.72 ± 0.05 | S |

[a]VS = Very Strong; S = Strong

The preparation of silicalite is set forth in Examples 3, 5, 6 and 7, of U.S. Pat. No. 4,061,724, which examples are incorporated herein by reference.

The above-mentioned ZSM-type zeolites are described in various U.S. Patents and Foreign Patents as follows:

ZSM-5 is a crystalline zeolite and is disclosed in U.S. Pat. No. 3,702,886. The preparation of ZSM-5 is set forth in Examples 1, 2, 6, 22, 26 and 27 of U.S. Pat. No. 3,702,886, which examples are incorporated herein by reference.

ZSM-8 is a crystalline zeolite and is disclosed in British specification No. 1,334,243, published Oct. 17, 1973.

ZSM-11 is a crystalline zeolite and is disclosed in U.S. Pat. No. 3,709,979.

The preparation of ZSM-11 is set forth in Examples 1, 2, 4, 5, 8 and 10 of U.S. Pat. No. 3,709,979, which examples are incorporated herein by reference.

ZSM-12 is a crystalline zeolite and is disclosed in U.S. Pat. No. 3,832,449. The preparation of ZSM-12 is set forth in Examples I, II, III, IV, V, VI, VII and VIII of U.S. Pat. No. 3,832,449, which examples are incorporated herein by reference.

U.S. Pat. Nos. 3,702,886 (ZSM-5), 3,709,979 (ZSM-11), and 3,832,449 (ZSM-12) are commonly assigned to Mobil Oil Corporation, New York, New York.

Ultrastabilized Y, i.e. ultrastabilized form of zeolite Y, is a form of zeolite Y which has been treated to give it the organophilic characteristic of the adsorbents of the present invention. A description of ultrastabilized Y is found in "Crystal Structures of Ultrastable Faujasites", Advances in Chemistry Series, No. 101, American Chemical Society, Washington, D.C., pages 266–278 (1971).

In addition to the above-mentioned high-silica zeolites, a particularly well suited high-silica zeolite, the zeolite used in the illustrative examples of the present invention, is the class of high-silica zeolites designated and hereinafter referred to as the Support A.

Support A comprises a class of zeolites, described more fully in co-pending U.S.P. application Ser. No. 655,065, filed Feb. 4, 1976, said class of zeolites comprising zeolite compositions which are readily composed by preparing an organic-free reaction mixture. These zeolite compositions are highly siliceous and can contain an extraordinarily high amount of divalent metal cations. Further, the high thermal and hydrothermal stabilities of these zeolite compositions, i.e. in excess of 600° C., make them ideally suited for the instant process.

The Support A compositions, abbreviated hereinafter as SA, exhibit an aluminosilicate crystal structure wherein at least some of the $AlO_4^-$ tetrahedra thereof are associated with, i.e. electrovalently neturalized by, a metal cation.

The composition of these zeolites in the dehydrated state can be expressed empirically in terms of moles of oxides as follows:

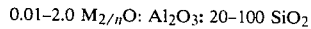
$0.01-2.0\ M_{2/n}O:\ Al_2O_3:\ 20-100\ SiO_2$ wherein M represents a metallic cation and n represents the valence of M as prepared from reaction mixtures free of organic cations, as hereinafter described.

These zeolites may also be exchanged with ammonium, or other cations, including metal ions, hydrogen ions, rare earth ions and mixtures thereof by contacting the zeolite with solutions containing one or more of the desired cations.

In conjunction with the aforesaid chemical composition, these zeolites, i.e. SA compositions, possess a distinguishing crystalline structure characterized by an X-ray powder diffraction pattern having at least the following interplanar spacings:

TABLE I

| Interplanar Spacing, d (A) |
|---|
| 11.1 ± 0.2 |
| 10.1 ± 0.2 |
| 3.85 ± 0.07 |
| 3.74 ± 0.05 |
| 3.72 ± 0.05 |

These values were determined by standard techniques. The radiation was the K-alpha doublet of copper, and a scintillation-counter spectrometer with a strip-chart pen recorder was used. The peak heights and the peak or line position as a function of two times theta ($\theta$), where theta is the Bragg Angle, were read from the spectrometer chart. From these, the relative intensities and d (observed), the interplanar spacing in A, corresponding to the recorded lines, were determined.

Ion-exchange of the original cations by other cation species does not substantially alter the X-ray pattern of Support A, but some minor shifts in interplanar spacing and variations in relative intensity can occur. Other minor variations can occur depending on the silica-to-alumina ratio of the particular sample and whether or not the sample had been subjected to elevated temperatures. In any event the d-spacings of the X-ray pattern will be within the tolerance indicated in Table 1.

In conjunction with the aforesaid chemical composition and X-ray powder diffraction pattern, the SA compositions exhibit certain distinguishing infrared absorption characteristics. Infrared analytical techniques are recognized as highly useful in the study of crystalline zeolites; see for example U.S. Pat. Nos. 3,506,400 and 3,591,488 to Eberly et al., issued Apr. 14, 1970 and July 6, 1971, respectively, and E. M. Flanigen, H. Khatami and H. A. Szymanski, "Adv. Chem. Series"., Vol. 101, 1971 (pg. 201 et seq.).

Infrared analysis was also employed to characterize these siliceous zeolites. Spectra were obtained on a Perkin-Elmer Model 112 single-beam instrument for the hydroxylstretching region 3800–3000 $cm^{-1}$, on a Perkin-Elmer Model 621 double-beam instrument for both the mid-infrared region 1600–1300 $cm^{-1}$ and the framework region 1300–3000 $cm^{-1}$. After calcination at 600° C. in air, the samples were run as self-supported wafers (20 mg.), and the spectra in the hydroxyl-stretching region were obtained after thermal treatments at 200° C. in vacuum for two hours.

The process of the invention utilizes these metal-containing high-silica zeolite compositions which include "3-way" catalysts comprising Support A with copper metal or copper ions. These catalysts are hereinafter designated by the abbreviations Cu-SA, wherein this abbreviation designates metal or metal ions of Cu introduced directly into the framework of Support A. This "3-way" catalyst is used to illustrate the process of the invention. Cu-ultra-Y is also a preferred "three-way" catalyst. In addition, the ZSM-5 type zeolites i.e. ZSM-5, ZSM-8, ZSM-11 and ZSM-12, hereinbefore described, are preferred catalysts when in an appropriately metal-containing form, i.e. when copper metal or copper ions are introduced into the framework of these high-silica zeolites.

In order to more easily describe the conditions under which the instant process is carried out in the illustrative examples hereinafter, the rate at which the gaseous stream passes through the catalyst bed is expressed by reference to the "space velocity". The space velocity (SV) is defined as the volume of gas (V) passing through a given volume of catalyst space (Vc) divided by the catalyst space (Vc), i.e. SV=V/Vc. A space velocity of 10,000 hr$^{-1}$ means that the quotient of V/Vc is equal to 10,000.

Gas Flow Apparatus

In carrying out the process of the invention a gas flow apparatus is used wherein a reaction container is formed from a pyrex oven comprising a pyrex container having nichrome wire wrapped around it for heating.

The particular pyrex oven used in the examples set forth hereinafter, comprises an inner pyrex tube (25 mm.) placed within an outer pyrex tube wherein approximately 2 mm. separates the inner and outer tubes. The inner tube is wrapped with nichrome wire, by which the reaction container is heated and two side arm tubes extend from the inner tube. The side arm tubes are spaced approximately 12 cm apart and enable the introduction of the influent stream and removal of effluent stream. A thermowell unit, comprising a 4 mm tube, is placed at approximately the middle of the inner tube wherein a thermocouple is placed, by means of which the temperature of the reaction container may be monitored and controlled.

By means of the nichrome wire heater the temperatures of the catalyst bed region and a preheat region, comprising quartz chips, are maintained at the desired reaction temperature. After reaction the effluent stream, comprising essentially carbon dioxide, water and nitrogen exit the reaction container via one of the side arm members and is monitored by means of a $CO_2$ infrared analyzer and/or a vapor phase chromatograph, wherein the nitrogen is analyzed.

Catalyst Preparation

In accordance with the process of the present invention, as above-described, an organophilic high-silica zeolite is prepared such that the silica to alumina ratio is about 20 or greater. This high-silica zeolite, the zeolite used in the examples illustrating the instant process, is prepared by initially forming a reaction mixture, as follows, by:

(a) dissolving 1.98 pounds of reagent-grade NaOH in 13.2 pounds of water at 95° C. with agitation:
(b) dissolving 1.19 pounds of sodium aluminate into the solution of (a);
(c) thoroughly mixing 54.5 pounds of "LUDOX LS", aqueous colloidal silica sol, and 120 pounds of water in a 100-gallon kettle;
(d) mixing 1.98 pounds of a "ZSM-5-type" zeolite crystals with 2 pounds of water;
(e) mixing the hot solution of (b) into the silica-water mixture of (c);
(f) adding the crystal-water mixture of (d) to the mixture of (e); and
(g) agitating the mixture of (e) for 5 minutes.

The reaction mixture formed above is maintained at a temperature of about 150° C. for about 120 hours. The solid reaction product is separated from the liquor by filtration, washed with 100 gallons of water and dried. Upon chemical analysis the reaction product is determined in the anhydrous state to have approximately the following composition:

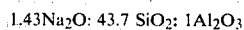
1.43$Na_2O$: 43.7 $SiO_2$: 1$Al_2O_3$

A sample of the reaction product, when submitted for X-ray powder diffraction analysis, is identified as a zeolite having a characteristic X-ray powder diffraction pattern containing at least the d-spacings of Table 1.

The product filter cake of the above zeolite is made up into ⅛ inch pellets by blending the filter cake with acid-peptized alumina, in a weight ratio of 80 parts of anhydrous zeolite product to 20 parts alumina, and extruding this blended mixture. The extruded pellets are calcined for 2 hours at 600° C. The above-prepared high-silica zeolite is determined to be the high-silica zeolite previously designated as Support A.

One hundred grams of the Support A pellets are added to a freshly filtered copper (II) chloride hydrate solution, prepared by dissolving 107.2 g. of the copper (II) chloride hydrate in 2000 milliliters of distilled water. The solution and Support A pellets are gently refluxed for three hours at which time the supernatant is decanted off. This process is repeated two additional times, for a total of three, and then the pellets are washed at room temperature for 1 hour with 2000 milliliters of distilled water with an occasional gentle swirling. The filtered pellets are then dried at 100° C. This catalyst is the catalyst previously designated as and is herein designated as catalyst Cu-SA. The catalyst Cu-SA pellets are activated by passing a stream of air containing 16 mole percent $NO_2$ at temperatures from 25° C. to 250° C. over the catalyst pellets for a period of 1 hour, followed by 1 hour at 350° C. in an air purge. Chemical analysis of a sample of this catalyst indicates that 7.3% copper, by weight, is present.

EXPERIMENTAL PROCEDURE

The experimental procedure used for carrying out the following examples, hereinafter discussed, is except as noted otherwise, as follows:

The examples are conducted in a thermostated reaction container, as described above, comprising an up flow mode glass tubular oven (with approximately a 20 mm internal diameter) having a preheat and catalyst bed region simultaneously heated by a nichrome wire wherein the temperature of the two regions is controlled by a Weather-Measure proportional process temperature and power controller. The two oven regions are: (1) a preheat region packed with quartz chips; and (2) a catalyst bed region packed with a 2.0 gram portion of a particular copper-containing high-silica zeolite catalyst in the form of 8–20 mesh pellets, as discussed above.

The temperature of the catalyst bed is monitored and controlled by a thermocouple placed in a thermowell axially centered midway up the catalyst bed.

In carrying out the examples, the gaseous stream is fed into the glass oven inlet where the stream is heated, if necessary, to the desired temperature of the preheat region before entering the catalyst bed region of the oven. The effluent from the catalyst bed region may be sampled periodically by passing the effluent stream to a sampling valve for periodic analysis by gas chromatography. Carbon dioxide, nitrogen, as well as residual hydrocarbon concentrates are also measured periodically.

These vapor phase chromatographic, i.e. gas chromatographic, determinations are carried out on either a Varian 2820 gas chromatograph equipped with a thermal conductivity detector, using a stainless-steel column (10 feet×⅛ inch) packed with Parapak Q (Waters Associates). These determinations were made after about 15 minutes at each temperature, as incremented, and when the temperature reached 350° C. another determination was made after a minimum of 60 minutes.

EXAMPLE 1

According to the above-described experimental procedure, a 2.0 g portion of the catalyst Cu-SA was packed between layers of quartz sand in an upflow mode glass tubular oven having a 20 mm ID. and with a thermowell axially centered for a thermocouple and positioned midway up the catalyst bed region.

The catalyst was initially activated by flowing a mixture of approximately 25 mole percent $NO_2$ in air over the catalyst bed while heating the catalyst bed from ambient temperatures to about 350° over about an 1 hour period. After about 1 hour the flow of $NO_2$ in air was discontinued and the bed was purged with 10% oxygen in helium at 350° C. for about ½ hour.

A mixture of ten parts helium, one part carbon monoxide and one part nitric oxide was passed over the catalyst bed at a GHSV (gas hourly space velocity) of approximately 2100 $hr^{-1}$.

The effluent coming off the catalyst bed was analyzed by intervals, i.e. for 50° C. intervals, by vapor phase chromatography, wherein said 50° C. intervals are based on the temperature of the catalyst bed. The results of these measurements showed that the conversion of NO to $N_2$ was approximately 100% for a catalyst bed temperature of 350° C.

EXAMPLE 2

Example 1 was repeated, except that the gaseous mixture that was passed over the activated catalyst bed of catalyst Cu-SA wherein said mixture comprised 10 parts helium, one part carbon monoxide and one part nitrogen dioxide.

The effluent coming off the catalyst bed was analyzed by vapor phase chromatography at intervals of 50° C. for increasing catalyst bed temperatures. The results of these measurements showed that the reduction of $NO_2$ was approximately 100% at a temperature of 300° C., based on available reductant.

EXAMPLE 3

Example 1 was repeated, except that the gaseous mixture that was passed over the activated catalyst bed of catalyst Cu-SA was a mixture comprising 10 parts helium, one part methane, and one part nitrogen oxide.

The effluent coming off the catalyst bed was analyzed by vapor phase chromatography at intervals of 50° C. for increasing catalyst bed temperatures. The analysis showed the conversion of NO to be complete at about 350° C. Analysis showed that the NO was converted to $N_2$ (87%) and $N_2O$ (13%) and that no ammonia was present.

EXAMPLE 4

According to the above-described experimental procedure a 2.0 ml. portion of pelletized catalyst Cu-SA (40–80 mesh) was packed into the glass tubular oven as described in example 1 and activated in the same manner as the catalyst Cu-SA powder in example 1.

The "three-way" nature of catalyst was tested by passing a mixture of gases through the catalyst bed. The mixture consisted of 400 parts helium, 6 parts carbon monoxide, 2 parts propylene, 20 parts oxygen and 3 parts nitric oxide. The mixture was passed through the catalyst bed at a gas hourly space velocity of approximately 13,000 $hr^{-1}$ and the catalyst bed temperature was varied in 50° C. increments, beginning at 50° C., up to 350° C. The effluent stream was sampled at each temperature increment and analyzed by gas chromatography for nitrogen, carbon monoxide, and propylene. Analysis of the effluent at 350° C. showed that approximately 100% of the carbon monoxide and propylene had been oxidized to carbon dioxide and water and that 56% of the nitric oxide was reduced to nitrogen. This high conversion of nitric oxide to nitrogen was achieved even with a stoichiometric oxidant excess of 121%.

EXAMPLE 5

Example 4 was repeated, except that instead of incrementing the catalyst bed temperature the catalyst bed temperature was maintained at 350° C. and the amount of oxygen in the mixture of gases was decremented from 131% over the stoichiometric amount required to 17% over stoichiometric amount. For these decreasing amounts of oxygen over stoichiometric the percent of nitric oxide that is converted to nitrogen was determined. As shown in Table II, and FIG. 1, the percent of nitric oxide which is converted to nitrogen is about 55% or greater and can be as high as about 90% or greater. The ability of the present process to operate on a lean air/fuel ratio and maintain a high percentage of conversion of nitric oxide to nitrogen is excellent even up to about a 131% stoichiometric excess.

TABLE II

| Excess $O_2$ over Stoichiometric oxidant (%) | Conversion of NO → ½$N_2$ |
|---|---|
| 90 | 61 |
| 121 | 56 |
| 114 | 97* |
| 131 | 69 |
| 119 | 53 |
| 73 | 76 |
| 42 | 88 |
| 17 | 90 |

*catalyst cooled before this measurement and believed to have absorbed nitric oxide.

The data in Table II show that for an internal combustion engine that over an air/fuel range of approximately 2 A/F units, assuming approximately 85% combustion in the engine, that the conversion of nitric oxide to nitrogen is not less than about 50%.

EXAMPLE 6

The effect of poisoning by sulfur was determined by placing a 14.5 gram portion of pelletized catalyst Cu-SA (8–20 mesh) into the glass tubular oven similar to that described in example 1 and then activating the catalyst as described in example 1.

Initially, a gaseous mixture consisting of 0.25% toluene (based on volume) in air was passed through the catalyst bed at a gas hourly space velocity of 10,000 $hr^{-1}$, and the temperature of the catalyst bed raised gradually until the exotherm of combustion began. This temperature was measured as 270° C. and is referred to as the temperature of ignition. The temperature of the catalyst bed was then raised to 380° C., referred to as the temperature of combustion, at which 100% combustion occurred.

The effects of sulfur on the three-way catalyst of the invention was considered by substituting 0.3% methyl mercaptan for the 0.25% toluene in air as the gaseous mixture being passed through the catalyst bed. An adiabatic temperature rise was observed with the catalyst bed temperature adiabatically reaching 600° C. The gaseous mixture containing methyl mercaptan was passed through the catalyst bed for about 20 hours until about 33 molar equivalents of sulfur had passed through the catalyst bed. After the 20 hours elapsed the combustion activity of the catalyst was determined by effecting the combustion of a gaseous mixture containing 0.25% toluene by passing it through the catalyst bed. The catalyst bed showed no measurable loss in combustion activity and had a temperature of ignition of 270° C. and analysis of the catalyst itself showed that less than about 13% of the copper atoms present could be associated with sulfate groups.

EXAMPLE 7

Example 1 was repeated, except that the gaseous mixture consisted of helium, oxygen and either carbon monoxide or methane. In each case the temperature of the catalyst bed was increased until complete combustion of either oxygen, carbon monoxide or methane occurred. The amount of each gaseous component was varied so that either oxygen, CO or $CH_4$ was in excess. The results of this lean to rich cycling was observed at 50° C. increments beginning at 50° C. and ending at 350° C. and showed that the activity of the catalyst was not affected for the mixtures set forth in Table III.

TABLE III

| Mixture | Stoichiometry (%) | | | |
|---|---|---|---|---|
| | CO | $O_2$ | $CH_4$ | He* |
| A-1 | 7.7 | 15.4 | — | bal. |
| A-2 | 15.4 | 7.7 | — | bal. |
| A-3 | 3.4 | 27.6 | — | bal. |
| A-4 | 27.6 | 3.4 | — | bal. |
| A-5 | — | 15.4 | 7.7 | bal. |
| A-6 | — | 7.7 | 15.4 | bal. |
| A-7 | — | 27.6 | 3.4 | bal. |
| A-8 | — | 3.4 | 27.6 | bal. |

*Helium is added to make 100%

The length of each cycle was about 2.5 to 3 hours and each cycle contstituted carrying out the combustion of each of the gaseous mixtures of mixtures A–H each time the catalyst bed temperature was incremented 50° C.

EXAMPLE 8

Example 7 was repeated, except that instead of incrementing the catalyst bed temperature for various gaseous mixtures containing carbon monoxide or methane the catalyst bed temperature is maintained at 250° C. for mixtures containing CO and at 350° C. for mixtures containing $CH_4$ and each mixture was combusted in turn for about 45 minutes. Table IV shows the various mixtures combusted. The catalyst showed no loss in activity over the ranges observed.

TABLE IV

| Mixture | Stoichiometry (%) | | | |
|---|---|---|---|---|
| | CO | $O_2$ | $CH_4$ | He* |
| B-1 | 12.5 | 3.8 | — | bal. |
| B-2 | 12.5 | 7.5 | — | bal. |
| B-3 | 12.5 | 15.0 | — | bal. |
| B-4 | 12.5 | 25.0 | — | bal. |
| B-5 | 12.5 | 50.0 | — | bal. |
| B-6 | 3.8 | 12.5 | — | bal. |
| B-7 | 7.5 | 12.5 | — | bal. |
| B-8 | 15.0 | 12.5 | — | bal. |
| B-9 | 25.0 | 12.5 | — | bal. |

TABLE IV-continued

| Mixture | Stoichiometry (%) | | | |
|---|---|---|---|---|
| | CO | $O_2$ | $CH_4$ | He* |
| B-10 | 50.0 | 12.5 | — | bal. |
| B-11 | — | 7.5 | 12.5 | bal. |
| B-12 | — | 15.0 | 12.5 | bal. |
| B-13 | — | 15.0 | 12.5 | bal. |
| B-14 | — | 50.00 | 12.5 | bal. |
| B-15 | — | 12.5 | 7.5 | bal. |
| B-16 | — | 12.5 | 15.0 | bal. |
| B-17 | — | 12.5 | 25.0 | bal. |
| B-18 | — | 12.5 | 50.0 | bal. |

*Helium is added to make 100%.

EXAMPLE 9

Example 1 was repeated, except that instead of the catalyst bed comprising catalyst Cu-SA the catalyst bed comprised a 2.0 gram portion of a copper-containing mordenite, prepared similarly to catalyst Cu-SA.

A gaseous mixture consisting of 60 parts helium, 9 parts CO and 4 parts NO was passed through the catalyst bed at a gas hourly space velocity of 2000 $hr^{-1}$. When the temperature of the catalyst bed was 400° C. the percentage of nitric oxide reduced to nitrogen was about 75%. This result is to be compared with the instant process wherein about 100% reduction of $NO_2$ was achieved at 350° C., as set forth in example 1.

EXAMPLE 10

The "three-way" catalytic process of the present invention was tested by carrying out the simultaneous oxidation and reduction of a gaseous mixture consisting of 1000 ppm $NO_x$, 340 ppm $C_3H_6$, 170 ppm $C_3H_8$, $1.0 \times 10^5$ ppm $CO_2$ and a mixture of $O_2$ and a 3:1 ratio of $CO/H_2$, being added to provide the desired A/F ratio. In addition, one mole of water was present for every nine moles of dry gaseous mixture.

Example 1 was repeated except that a catalyst bed of 20 cubic centimeters was employed in a stainless steel tubular oven of appropriate size having independently heated preheat and catalyst bed regions. The gas hourly space velocity was 50,000 $hr^{-1}$, the inlet temperature of the glass tube oven was 980°–990° F. and $NO_x$, CO and the total hydrocarbon content of the effluent stream were continuously monitored by suitable analytical means. This process was carried out using a freshly prepared and activated catalyst, as in Example 1.

In addition, an equivalent sample of catalyst Cu-SA was aged prior to use in this example to ascertain the activity of an aged catalyst. The aging was carried out by passing a gaseous mixture consisting of 10% $H_2O$ and 90% over the catalyst for 4 hours at a temperature of 1650° F. Table V shows the percent conversion of carbon monoxide, hydrocarbon (HC) and nitrogen oxide ($NO_x$) for various air/fuel ratio and redox ratios (i.e. ratio of reductant to oxidant).

Further, two additional catalysts were tested for the purpose of comparison. These catalysts were Pt/Rh on monolith chips 20 (ultra-Y) Pt/Rh on monolith chips 50 ($Al_2O_3$). The results of these tests are set forth in Table V.

The comparative tests show that the instant process provides a catalytic process which is generally comparable with the Pt/Rh catalysts over the air/fuel ratios tested. Table V shows that the aged copper-containing high-silica zeolites do show some slight loss of activity when the air/fuel ratio is over about 14.66.

TABLE V

| | | | | | | | | | | | | |
|---|---|---|---|---|---|---|---|---|---|---|---|---|
| | | | | | | % Conversion to Products | | | | | | |
| | | Catalyst (pelletized) | | | Catalyst (pelletized) (aged) | | | Pt/Rh on monolith chips 20 (11:1 Pt/Rh) (ultra-Y) | | | Pt/Rh on monolith Chips 50 ($Al_2O_3$) (12:1 Pt/Rh) | |
| Air/Fuel Ratio Redox Ratio | $CO \rightarrow CO_2$ | $HC \rightarrow CO_2 + H_2O$ | $NO_x \rightarrow N_2$* | $CO \rightarrow CO_2$ | $HC \rightarrow CO_2 + H_2O$ | $NO_x \rightarrow N_2$* | $CO \rightarrow CO_2$ | $HC \rightarrow CO_2 + H_2O$ | $NO_x \rightarrow N_2$* | $CO \rightarrow CO_2$ | $HC \rightarrow CO_2 + H_2O$ | $NO_x \rightarrow N_2$* |
| 14.23 / 2.39 | 63.4 | 52.4 | 83.2 | 57.9 | 43.0 | 91.0 | 54.1 | 99.0 | 57.3 | 76.9 | 94.6 | 100.0 |
| 14.37 / 1.80 | 71.2 | 61.4 | 82.4 | 68.1 | 51.0 | 90.5 | 67.6 | 100.0 | 70.4 | 76.8 | 98.4 | 100.0 |
| 14.44 / 1.56 | 74.2 | 70.4 | 83.7 | 72.2 | 57.6 | 92.8 | 75.4 | 100.0 | 91.1 | 80.8 | 100.00 | 97.0 |
| 14.52 / 1.34 | 75.9 | 83.2 | 92.1 | 63.1 | 64.4 | 48.3 | 84.9 | 100.00 | 96.8 | 85.4 | 100.0 | 99.1 |
| 14.58 / 1.16 | 75.6 | 86.6 | 29.5 | 61.3 | 73.2 | 15.4 | 90.9 | 100.0 | 87.5 | 92.5 | 100.0 | 97.9 |
| 14.66 / 1.00 | 85.3 | 92.0 | 19.8 | 50.9 | 67.8 | 0.0 | 100 | 100.0 | 29.7 | 98.6 | 100.0 | 30.4 |
| 14.73 / 0.86 | 74.2 | 87.0 | 13.7 | 52.8 | 69.8 | 0.0 | 99.1 | 99.0 | 10.2 | 98.6 | 100.0 | 1.9 |
| 14.88 / 0.63 | 64.7 | 82.2 | 11.1 | 60.9 | 67.4 | 0.0 | 99.3 | 98.0 | 1.0 | 99.4 | 97.6 | 0.0 |

*For each catalyst tested there was observed to be present in the effluent a small amount of base, which is presumed to be ammonia.

What is claimed is:

1. A process for the concurrent catalytic reduction of oxides of nitrogen and the oxidation of carbon monoxide and hydrocarbons contained in a gas stream wherein said process consists essentially of contacting the gas stream with a high-silica zeolite containing copper metal or ions, said zeolite having a silica to alumina ratio of at least 20, and wherein said gas stream contains a stoichiometric excess of oxidant.

2. The process of claim 1 wherein the gas stream is the exhaust stream of an internal combustion engine.

3. A process according to claim 1 wherein the oxidant comprises not less than 2 percent oxygen present in the gas stream.

4. A process according to claim 2, wherein the oxidant comprises less than 2 percent oxygen present in the gas stream.

5. A process for the concurrent catalytic reduction of oxides of nitrogen and the oxidation of carbon monoxides and hydrocarbons contained in the exhaust stream of an internal combustion engine wherein said process comprises contacting the exhaust stream with copper-containing high-silica zeolite at a temperature of about 350° C. or greater in the presence of oxygen and when the reductant to oxidant ratio is between about 0.50 and 2.39.

6. The process of claim 5 wherein the reductant to oxidant ratio is between about 0.63 and 2.39.

7. The process of claim 1 or 5 wherein the copper-containing zeolite is an organophilic zeolite composition having in the dehydrated state a composition in terms of mole ratios of oxides as:

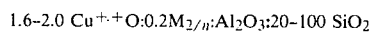

$$1.6\text{-}2.0\ Cu^{++}O:0.2M_{2/n}:Al_2O_3:20\text{-}100\ SiO_2$$

wherein M is at least one carbon having a valence of "n", said composition having a characteristic X-ray powder diffraction pattern containing at least the d-spacings of Table I.

8. The process of claim 5 wherein the copper-containing high-silica zeolite has a silica to alumina ratio of at least 20.

9. The process of claim 7 wherein M represents an alkali metal cation.

10. The process of claim 7 wherein the $SiO_2/Al_2O_3$ mole ratio is from 35 to 85.

11. The process of claim 7 wherein the $SiO_2/Al_2O_3$ mole ratio is from 35 to 55.

12. The process of claim 1 or 8 wherein the copper-containing high-silica zeolite is a ZSM-5 type zeolite.

* * * * *